A

(12) United States Patent
Bailly

(10) Patent No.: US 6,304,290 B1
(45) Date of Patent: Oct. 16, 2001

(54) METHOD FOR THE VIDEO-ASSISTED REMOTE CONTROL OF MACHINES, ESPECIALLY VEHICLES, AND DEVICE FOR THE IMPLEMENTATION OF THIS METHOD

(75) Inventor: Michel Bailly, Nouan le Fuzelier (FR)

(73) Assignee: Societe M 5, Salbris (FR)

( * ) Notice: Subject to any disclaimer, the term of this patent is extended or adjusted under 35 U.S.C. 154(b) by 832 days.

(21) Appl. No.: 08/527,334

(22) Filed: Sep. 12, 1995

(30) Foreign Application Priority Data

Sep. 27, 1994 (FR) .................................................. 94 11497

(51) Int. Cl.$^7$ ....................................................... H04N 7/18
(52) U.S. Cl. ........................... 348/119; 348/148; 348/159
(58) Field of Search .................................... 348/148, 159, 348/153, 143, 144, 158, 150, 113, 114, 118, 119, 36, 38, 82, 83, 84, 564, 584, 588; H04N 7/18

(56) References Cited

U.S. PATENT DOCUMENTS

| | | |
|---|---|---|
| 3,564,134 | 2/1971 | Rue et al. . |
| 4,405,943 | 9/1983 | Kanaly . |
| 4,814,869 | * 3/1989 | Oliver, Jr. .............................. 348/159 |
| 4,855,822 | 8/1989 | Narendra et al. . |
| 5,045,937 | * 9/1991 | Myrick ................................. 348/144 |
| 5,155,683 | * 10/1992 | Rahim .................................. 348/119 |
| 5,170,352 | 12/1992 | McTamaney et al. . |
| 5,216,502 | * 6/1993 | Katz ..................................... 348/150 |
| 5,448,290 | * 9/1995 | VanZeeland .......................... 348/159 |
| 5,481,257 | * 1/1996 | Brubaker et al. ..................... 348/114 |
| 5,508,736 | * 4/1996 | Cooper ................................. 348/144 |

FOREIGN PATENT DOCUMENTS

| | | |
|---|---|---|
| 3928244 C1 | 8/1989 | (DE) . |
| 0 606173 A1 | 7/1994 | (EP) . |
| WO 90/02370 | 3/1990 | (WO) . |

OTHER PUBLICATIONS

NIC '91 National Telesystems Conference Proceedings, IEEE, vol. 1, "Surrogate Teleoperated Vehicle (STV)", S. Myers, Atlanta, USA, Mar. 26 and 27, 1991, pp. 315–320.
IEEE, Southeastcon '90 Proceedings, vol. 2 of 3, "A Human Factors Tested For Ground–Vehicle Telerobotics Research", Corbett et al., New Orleans, US, Apr. 1–4, 1990, pp. 618–620.

* cited by examiner

*Primary Examiner*—Howard Britton
(74) *Attorney, Agent, or Firm*—Oblon, Spivak, McClelland, Maier & Neustadt, P.C.

(57) ABSTRACT

The video-assisted remote control device disclosed comprises a remote control station and a station on board the machine to be remote controlled. The latter comprises a real-time mixing unit, a video and audio transmitter and a remote control receiver. The control station comprises several monitors, a video and audio receiver and a remote control transmitter. Application to the remote control of public works machines.

9 Claims, 1 Drawing Sheet

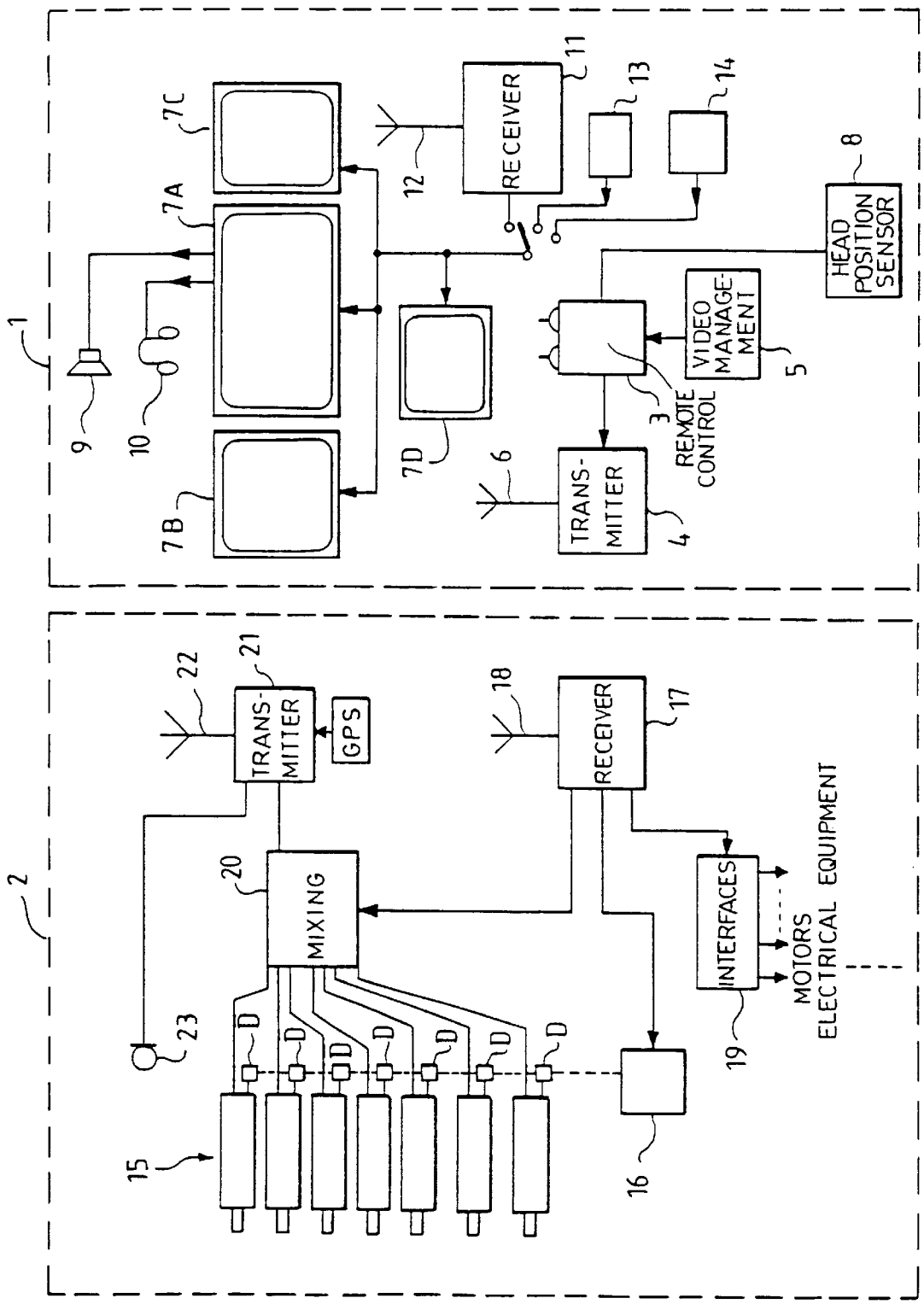

METHOD FOR THE VIDEO-ASSISTED REMOTE CONTROL OF MACHINES, ESPECIALLY VEHICLES, AND DEVICE FOR THE IMPLEMENTATION OF THIS METHOD

BACKGROUND OF THE INVENTION

1. Field of the Invention

The present invention relates to a method for the video-assisted remote control of machines, especially vehicles, as well as to a device for the implementation of this method.

For the remote control of vehicles such as those used in public works, it is necessary in particular to view the environment of this vehicle, at least as completely as it would be seen by a driver if he were at the controls of this vehicle.

2. Description of the Prior Art

In a first known approach, this problem of viewing is resolved by providing the remote-controlled vehicle with several video cameras oriented in different ways or having different focal lengths and by transmitting their video signals sequentially on an HF channel. While such an approach is satisfactory for a vehicle that is at a standstill or running at low speed, it cannot be envisaged for a vehicle running at high speed and/or having devices (mechanical shovels, manipulators etc.) that have to be controlled with very short reaction times.

In one variant of this first approach, the video signals from several cameras are assembled (for example in groups of four) to form a single image divided into several zones (for example four zones), each one of which corresponds to the image given by one of the cameras. This single image is transmitted on a single transmission channel and displayed with these same zones at reception. Such an approach not only reduces the size of the different partial images but is difficult to interpret owing to the fact that the arrangement of the partial images (each occupying one quadrant of the display screen) does not correspond to the arrangement of the cameras.

SUMMARY OF THE INVENTION

An object of the present invention is a method for the remote control of machines, especially vehicles, enabling the real-time viewing of the environment of these machines, as realistically as possible, by using only one video transmission channel between a machine and its remote control station.

An object of the invention is also a device for the implementation of this method that costs little, can easily be fitted into practically any type of machine and is strongly built.

The method according to the invention comprises, in a remote control center, a transmitter of remote control data and a video and audio receiver and at least one video monitor and, in the machine to be remote-controlled, a video and audio transmitter and a remote control receiver, several video cameras and a video mixing device. Advantageously, when the machine is subjected to vibrations, the cameras and, if necessary, the fragile electronic equipment that it comprises, are fitted out with devices that dampen the vibrations that could be communicated to them.

BRIEF DESCRIPTION OF THE DRAWING

The present invention will be understood more clearly from the following detailed description of an embodiment, taken as a non-restrictive example and illustrated by the appended drawing, of which the single FIGURE is a block diagram of a preferred embodiment of the invention.

MORE DETAILED DESCRIPTION

The device of the invention, schematically represented in the single FIGURE of the drawing, essentially comprises a control station 1 that is generally fixed (but may also be mobile), and a remote-controlled station 2 positioned on the mobile machine and/or subjected to vibrations. This machine may be, for example, a public works machine (such as a mechanical shovel, excavating machine etc), a remote handling device, a military or space vehicle etc.

The control station 1 in which there is the operator carrying out the remote control of the machine bearing the station 2 essentially has a remote control device 3 connected to a transmitter 4 and a video management pack 5. The transmitter 4 is, for example, a radio transmitter, in which case it is connected to a transmission antenna 6 (should the link between the control station and the machine be set by RF links). The transmitter 4 may also be a cable adaptor if the link is set up by wire. The pack 5 essentially comprises the remote control units for the mixing device (described here below) of the station 2. These remote control units are, for example, those pertaining to the selection of the views of the different cameras of the station 2, the overlaying of detailed views on general views etc.

The control station 1 essentially comprises display monitors 7A, 7B, etc. Each of these monitors has the task of displaying a part, the importance of which is variable, of the scene around the machine in every possible direction and, if necessary, in the cabin of the machine. In the example shown in the drawing, the station 1 has a chief monitor 7A capable of providing the simultaneous and real-time display of the images picked up by the front cameras (for example three cameras) of the machine. This images are mixed, in a manner known per se, in the station 2 so that they can be displayed on a single screen. The mixing may consist, for example, in juxtaposing cameras with adjacent fields to obtain a resultant image with a wide horizontal field, or in overlaying one or more images of details (obtained by cameras with large focal lengths) or overlaying zones of interest on a main wide-field image. These zones of interest may be determined, for example, by position sensors 8 on the operator's head.

In addition to the chief monitor 7A, the station 1 has one or more other monitors, such as the monitor 7B, whose task is to display the field of view behind the machine, and the monitors 7C, 7D whose task is to display the fields of view at the sides of the machine. Naturally, the machine is fitted out with corresponding cameras that pick up these different fields. Thus, the visual environment of the machine is restored as realistically as possible such as it would be seen by an operator aboard the machine (or even better, such as it would be seen if the cameras used were to be cameras with very wide fields or very large focal lengths). Advantageously, the station 1 has a loudspeaker 9 and/or an audio headphone 10 (connected for example to the monitor 7A) reproducing the sound ambience aboard the machine and/or around it.

The different monitors of the station 1 are connected to a video and audio receiver 11 provided with an antenna 12. In the case of a wire link between the stations 1 and 2, the receiver 11 is replaced by a cable terminal. The station monitors 1 may also be connected to other information sources such as a GPS receiver 13, an ambience camera 14 (filming for example the environment of the control station 1).

The station 2 has several cameras, together referenced 15. These cameras are oriented in different directions (elevation and/or bearing) in order to pick as much of the environment as desired of the machine that has the station 2. It is also possible to point one or more of these cameras towards the interior of the machine (in order to check dashboard instruments or machines etc.). Each of these cameras, or a part of them, has a device D to control focal distance (zoom function), possibly a device to control sharpness and a device to control orientation (elevation and/or bearing). These different control devices are connected to a central control device 16, which is itself connected to a remote control receiver 17 provided with a reception antenna 18. This receiver 17 is also connected to an interface device 19 comprising servo-valves and, if necessary, other electro-hydraulic, electromechanical or electrical control devices enabling the different instruments or sub-assemblies of said machine (such as control devices for engines, hydraulic shovels, steering systems, headlights, hooters etc.) to be controlled.

The video outputs of the cameras 15 are connected to a real-time mixing unit 20, whose control input is connected to the receiver 17. This unit 20 is of the "mixing desk" type commonly used in television studios or in simulators to obtain, in particular, overlays of images coming from different sources (unlike in the case of multiplexing in which signals coming from several sources are transmitted sequentially on a single channel).

The unit 20 also carries out the digitization of the video signals from the cameras 15 and the image-by-image synchronization of their video signals.

The unit 20 may thus, for example, select a background image with a wide optical field (in elevation and/or in bearing), generally with low or average definition, on which it overlays one or more images with a small optical field and with higher definition (images of zones of interest). The position of the overlaid images with respect to the background image is advantageously variable, for example as a function of the orientation of the machine or of the head of the operator of the station 1 when, as specified here above, the station 1 has a position sensor 8. Instead of or in addition to overlaying small images on a background image, it is possible to juxtapose images coming from cameras pointed towards adjacent regions of the space surrounding the machine in order to set up a panoramic image (with a very wide optical field). The output of the unit 20 is connected to a transmitter 21 provided with an antenna 22 and advantageously connected to one or more microphones 23 picking up the sound ambience inside and/or outside the machine and, as the case may be, the noises produced by particular devices of the machine (for example, in order to make an auditory check on the working of the machine).

The transmitter 21 is also advantageously connected to a GPS type localizing device 24. Naturally, the characteristics of the receivers 11 and 17 correspond to those of the transmitters 21 and 4 respectively. In the case of a wire link, the receiver 17 and the transmitter 21 are replaced by appropriate cable terminals.

Advantageously, the cameras 15, the unit 20 and the electronic devices at the station 2 are "hardened" in a manner known per se against vibrations of said machine if, of course, vibrations can occur in this machine. For example, in the case of public works machines, the hardening must enable the equipment thus protected to withstand vibrations of up to 10 G.

What is claimed is:

1. A method for video-assisted remote control of a machine in order to enable real-time viewing of an environment of said machine wherein said machine includes a plurality of cameras and wherein a remote control station is positioned separate from said machine with communication between said remote control station and said machine being accomplished by one of wire links and radiowaves, said method comprising the steps of:

mixing, in said machine, video signals from at least two of said plurality of cameras to form a wide-field image encompassing a wider field of view than the field of view of any one of the plural cameras and outputting a resultant signal including said wide-field image;

transmitting said resultant signal from said machine to said remote control station on a single transmission channel;

viewing said resultant signal at said control station on at least one display device; and transmitting remote control commands from said remote control station to said machine and to said plurality of cameras.

2. A method according to claim 1, wherein the mixing further includes overlaying at least one image from another one of the plural cameras onto the wide-field image provided from the at least two of said plurality of cameras.

3. A method according to claim 1, wherein the remote control commands for the cameras include commands for their orientation in elevation and/or in bearing.

4. A method according to claim 1, wherein the commands for the remote control of the cameras include commands to control their focal distance.

5. A device for video-assisted remote control of a machine to enable real-time viewing of an environment of said machine, said device comprising:

a remote control center including a transmitter of remote control data, a video and audio receiver and at least one video monitor; and wherein said machine includes a video and audio transmitter, a remote control receiver, a plurality of video cameras and a video mixing device, and wherein the transmitter on board the machine is connected to a GPS type localizing device.

6. A system for video-assisted remote control of a machine to enable real-time viewing of an environment of said machine, said system comprising:

a remote control center including a transmitter of remote control data, a video and audio receiver and at least one video monitor; and wherein said machine includes a video and audio transmitter, a remote control receiver, a plurality of video cameras and a video mixing device configured to receive inputs from at least two of said plurality of cameras and to provide a wide-field image encompassing a wider field of view than the field of view of any one of the plural cameras as a resultant signal, said video mixing device being connected to said video and audio transmitter which is configured to transmit the resultant signal to the video and audio receiver which is connected to the at least one video monitor with a resulting display of the wide-field image.

7. A device for video-assisted remote control of a machine to enable real-time viewing of an environment of said machine, said device comprising:

a remote control center including a transmitter of remote control data, a video and audio receiver and at least one video monitor; and wherein said machine includes a video and audio transmitter, a remote control receiver, a plurality of video cameras and a video mixing device, and wherein said plurality of cameras and fragile electronic instruments on board the machine include devices for damping vibrations.

8. A device according to claim 6, wherein at least one of the cameras comprise orientation control devices and/or focal distance control devices connected to the remote control receiver on board the machine.

9. A device according to claim 6, wherein the transmitter on board the machine is connected to at least one microphone.

* * * * *